United States Patent [19]
Ellers et al.

[11] Patent Number: 5,524,838
[45] Date of Patent: Jun. 11, 1996

[54] METHOD AND APPARATUS FOR PROCESSING TIRES TO RECLAIM RUBBER, METAL, AND FABRIC

[76] Inventors: H. John Ellers, 1135 Dearing, Memphis, Tenn. 38117; Milton M. Masson, 12599 N. 72nd Pl., Scottsdale, Ariz. 85260

[21] Appl. No.: 319,670

[22] Filed: Oct. 7, 1994

[51] Int. Cl.[6] .......................... B02C 18/06; B02C 18/40; B02C 19/12
[52] U.S. Cl. .......................... 241/23; 241/24.14; 241/29; 241/DIG. 31; 241/DIG. 37
[58] Field of Search ................................ 241/23, 24, 29, 241/DIG. 31, DIG. 37, 236, 79.1

[56] References Cited

U.S. PATENT DOCUMENTS

| | | | |
|---|---|---|---|
| 3,718,284 | 2/1973 | Richardson | 241/23 |
| 3,995,816 | 12/1976 | Motek | 241/23 |
| 4,813,614 | 3/1989 | Moore et al. | 241/23 |
| 4,863,106 | 9/1989 | Perkel | 241/5 |
| 4,905,919 | 3/1990 | Okazaki | 241/160 |
| 5,234,171 | 8/1993 | Fantacci | 241/24 |
| 5,368,240 | 11/1994 | Bonnet | 241/41 |
| 5,385,307 | 1/1995 | Azar | 241/41 |

*Primary Examiner*—John Husar
*Attorney, Agent, or Firm*—Tod R. Nissle

[57] ABSTRACT

A method and apparatus for separating and recovering rubber, fiber, and steel from tires cryogenically cools and grinds tire rubber. The method reduces by 45 to 60 percent the amount of nitrogen required to cool and embrittle the rubber prior to being ground. Only the surface of the rubber is embrittled prior to grinding.

2 Claims, 4 Drawing Sheets

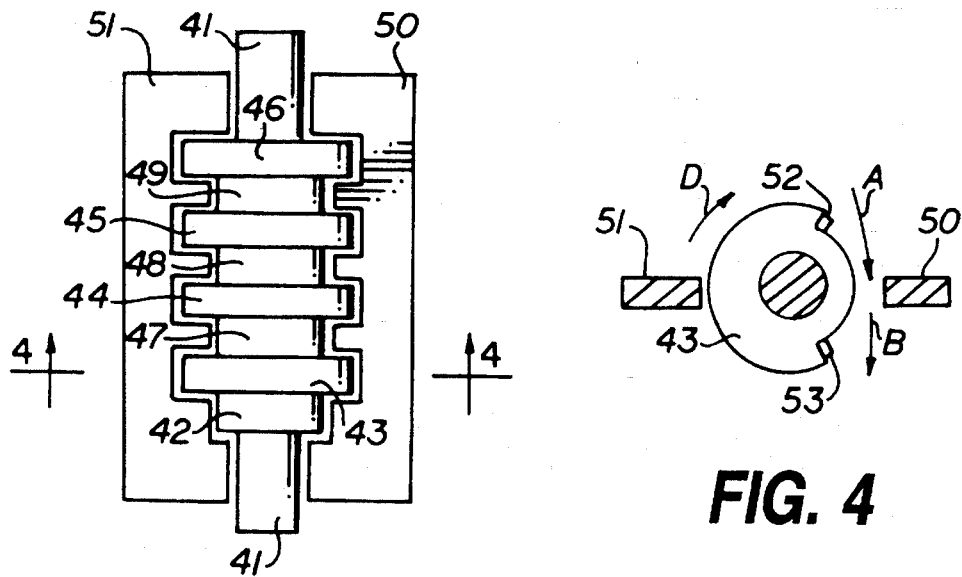
FIG. 3
FIG. 4
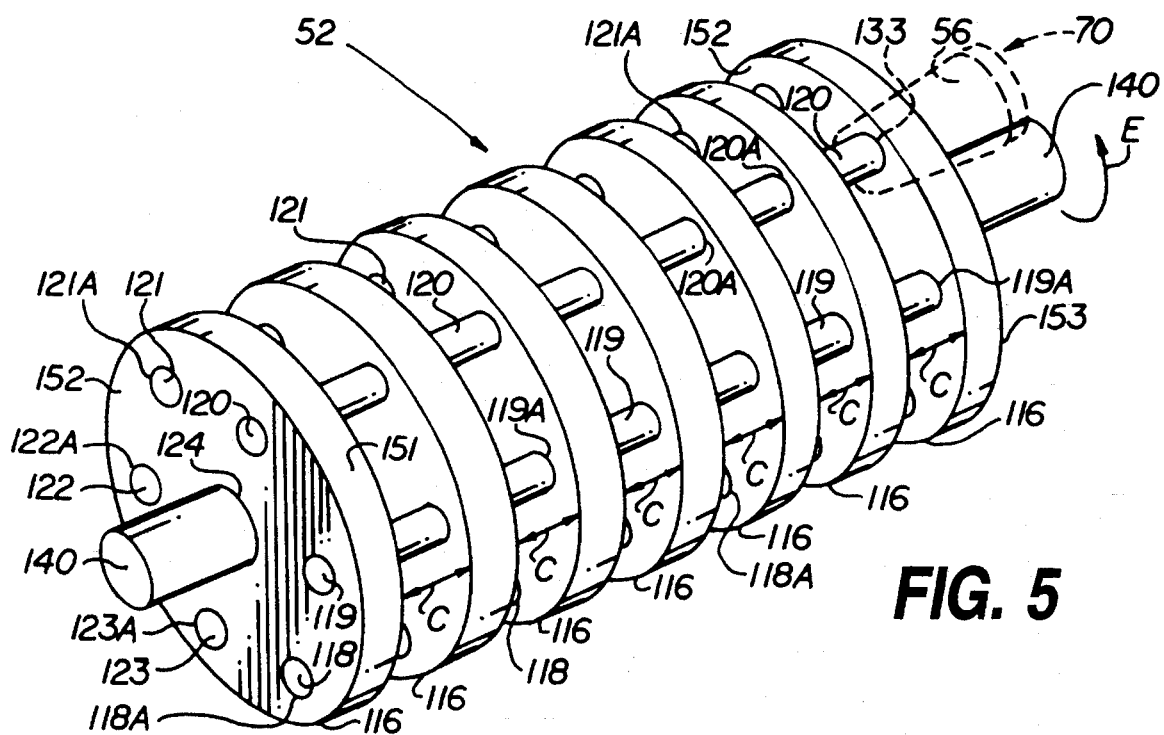
FIG. 5

METHOD AND APPARATUS FOR PROCESSING TIRES TO RECLAIM RUBBER, METAL, AND FABRIC

This invention relates to methods and apparatus for separating and recovering rubber, fiber, and steel from tires.

More particularly, the invention relates to a method for recovering tire derived fuel (TDF) from tires before the tires are granulated or cryogenically cooled.

In a further respect, the invention relates to a method and apparatus for cryogenically cooling and grinding tire rubber which reduces by 45% to 60% the amount of nitrogen required to cool and embrittle the rubber prior to being ground.

Methods and apparatus for processing used tires to recover rubber, fiber, and steel are well known in the art. For example, U. S. Pat. No. 4,025,990 to Lovette, Jr. discloses a process in which tires are shredded to produce pieces of rubber that are cryogenically frozen and ground in a hammer mill. One of the disadvantages associated with conventional tire reclamation processes like those disclosed in the Lovette, Jr. patent is the quantity of nitrogen consumed during the cooling and embrittlement of the rubber. Typically 1.1 pounds to 1.5 pounds of nitrogen is consumed per pound of rubber cooled. Another disadvantage associated with conventional tire reclamation processes is that TDF is not produced until after the tires have been shredded, cooled, and granulated or ground. It would be beneficial if marketable TDF could be produced during the initial shredding of tires so that an income stream could be generated before subjecting tire pieces to the more expensive cryogenic cooling process.

Accordingly, it would be highly desirable to provide an improved cryogenic apparatus and method which would separate and recover rubber, fiber, and steel from tires, which would produce a saleable by-product during the early shredding stages of the method, and which would significantly reduce the quantity of nitrogen required to embrittle rubber during the process.

Therefore, it is a principal object of the invention to provide an improved method and apparatus for reclaiming rubber, fiber, and steel from tires.

A further object of the invention is to provide an improved cryogenic process for recovering rubber, fiber, and steel from tires by embrittling tire pieces with nitrogen, the process significantly reducing the quantity of nitrogen required to sufficiently cool the tire pieces during the process.

Another object of the invention is to provide an improved cryogenic process for recovering rubber, fiber, and steel from tires, the improved process producing a marketable by-product after the tires are shredded and before the shredded tires are subjected to cryogenic cooling and grinding.

These and other, further and more specific objects and advantages of the invention will be apparent to those skilled in the art from the following detailed description thereof, taken in conjunction with the drawings, in which:

FIG. 3 is a top view illustrating the cylindrical rotating disk component of FIG. 2 in combination with toothed cutting edges used to shred tires;

FIG. 4 is a side view illustrating the rotating component—cutting edge unit of FIG. 3;

FIG. 5 is a perspective view illustrating a rotating cylindrical hammer assembly utilized in the hammer mill of the invention;

Figure 1:
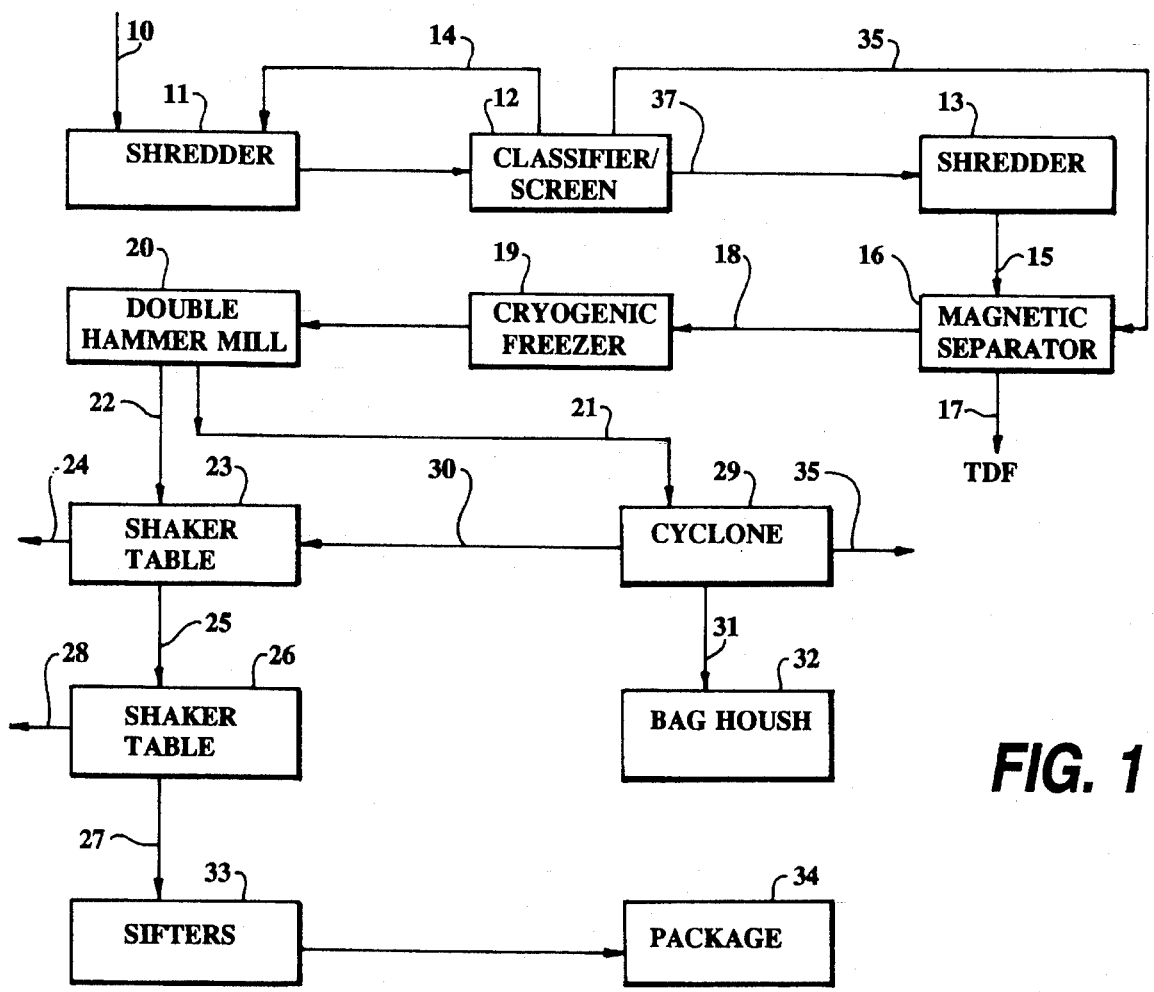
FIG. 1 is a flow diagram illustrating the improved tire processing method of the invention.

Briefly, in accordance with my invention, I provide an improved process for separating rubber and steel from tires. The process includes the steps of shredding a flow of tires into pieces by a tearing and shearing action produced on the tires by a first group of rotating cylindrical surfaces, the cylindrical surfaces forcing the tires intermediate said surfaces and stationary cutting edges; screening the flow of tire pieces by size into a first flow containing pieces at least as large as a specified size and into a second flow of pieces smaller than the specified size; reshredding and rescreening the pieces of the first flow until they are smaller than the specified size; producing a third flow of tire pieces each less than one inch in size by reshredding the pieces of the second flow by a tearing and shearing action produced on the pieces of the second flow by a second group of rotating cylindrical surfaces, the second group of cylindrical surfaces forcing the tires intermediate the second group of cylindrical surfaces and stationary cutting edges; and, separating steel and steel-containing rubber pieces from the third flow of tire pieces with a magnetic separator.

In another embodiment of the invention, I provide an improved process for separating rubber and fiber from tires. The process includes the steps of shredding a flow of tires into pieces each less than about one inch in width and having a thickness in the range of one-quarter of an inch to three-quarters of an inch; separating steel and steel-containing rubber pieces from the tire pieces with a magnetic separator to produce a flow of substantially steel-free rubber pieces; cryogenically cooling said substantially steel-free rubber pieces to a temperature of at least minus fifty degrees F, the rubber pieces each being cooled only to a surface depth in the range of 20% to 35% of the thickness of the piece; and, grinding the cryogenically cooled rubber pieces in a double hammer mill. The hammer mill includes first and second rotating hammer assemblies in spaced apart relationship such that hammers on the first rotating hammer assembly rotate in a direction opposed to the direction of rotation of hammer in the second hammer assembly, and move past and interfit between the paths of travel of hammers on the second hammer assembly at the point of closest approach to the second hammer assembly of the hammers on the first hammer assembly. The hammer mill also includes first and second striker bars; a first grinding zone wherein the cooled rubber pieces are forced against the first striker bar by the hammers on the first rotating hammer assembly; a second grinding zone between the first and second rotating hammer assemblies where partially thawed rubber pieces are sheared between interleaved hammers from the first and second rotating hammer assemblies; and, a third grinding zone wherein completely thawed rubber pieces are forced against the second striker bar by the hammers on the second rotating hammer assembly.

In a further embodiment of the invention, I provide an improved process for separating rubber and fiber from tires. The process comprises the steps of shredding a flow of tires into pieces; separating steel and steel-containing rubber pieces from the tire pieces with a magnetic separator to produce a flow of substantially steel-free rubber pieces; cryogenically cooling said substantially steel-free rubber pieces to a temperature of at least minus fifty degrees F, said pieces each being cooled only to a surface depth in the range of 20% to 35% of the thickness of the piece; and, grinding the cryogenically cooled rubber pieces.

In still another embodiment of the invention, I provide a hammer mill for grinding cryogenically cooled rubber pieces. The hammer mill includes first and second rotating hammer assemblies in spaced apart relationship. Hammers on the first rotating hammer assembly rotate in a direction opposed to the direction of rotation of hammer in the second hammer assembly, and move past and interfit between the paths of travel of hammers on the second hammer assembly at the point of closest approach to the second hammer assembly of the hammers on the first hammer assembly. The hammer mill also includes first and second striker bars; a first grinding zone wherein the cooled rubber pieces are forced against the first striker bar by the hammers on the first rotating hammer assembly; a second grinding zone between the first and second rotating hammer assemblies where partially thawed rubber pieces are sheared between interleaved hammers from the first and second rotating hammer assemblies, and a third grinding zone wherein completely thawed rubber pieces are forced against the second striker bar by the hammers on the second rotating hammer assembly.

Turning now to the drawings, which depict the presently preferred embodiments of the invention for the purpose of illustrating the practice thereof and not by way of limitation of the scope of the invention, and in which like reference characters refer to corresponding elements throughout the similar views, FIG. 1 is a block diagram illustrating the apparatus and method of the invention. In FIG. 1, tires are fed 10 into a shredder 11 to produce pieces of tire. The pieces produced by shredder 11 are directed into a daisy wheel classifier/trommel screen 12 classifying operation. The pieces from shredder 11 are first directed into a trommel screen comprised of a hollow rotating cylinder or cage having one and a half inch openings formed through the cylinder. Pieces of tire which are less than about one and a half inches wide fall through the openings in the trommel screen and are directed 35 to the magnetic separator. The pieces of tire which pass through the trommel screen without falling through the openings in the screen (i.e., the pieces which are greater than one and a half inches wide), are directed into a daisy wheel classifier. The daisy wheel classifier consists of a series of parallel spaced apart rotating horizontally oriented rollers. Each pair of adjacent rollers in the daisy wheel classifier is about four inches apart such that tire pieces in the range of about 1.5 inches to 4.0 inches wide fall between the rollers and are collected. The tire pieces which travel over the rollers in the daisy wheel classifier without falling downwardly between the rollers are greater than 4.0 inches wide and are directed 14 back to shredder 11. The pieces of tire which fall between the daisy wheel rollers and are 1.5 to 4.0 inches wide are directed 37 to shredder 13. Tire pieces directed 37 into shredder 13 are reduced in size to pieces which are about one to four inches long, preferably one and a half to two an a half inches long, and which have a thickness of one-quarter of an inch to one inch. The flow of tire pieces produced by shredder 13 is directed through a magnetic separator 15 which separates out most of tire pieces containing steel. The tire pieces containing steel are called "wiber" and are directed 18 into the cryogenic freezer 19. The other tire pieces, which are substantially rubber and fiber and contain about 85% by weight rubber, about 10% by weight fiber, and about 5% by weight steel, comprise tire derived fuel (TDF). The TDF is packaged and marketed.

The cryogenic freezer 19 cools the surfaces of each piece of wiber to a depth in the range of fifteen to forty, preferably twenty-five to thirty, percent of the thickness of the wiber. The surfaces are cooled to a temperature sufficient to embrittle the surfaces. Consequently, the surfaces of each wiber piece are cooled to at least minus one hundred and twenty degrees F and preferably to a temperature in the range of at least minus one hundred and forty F to minus one hundred and eighty degrees F. The wiber is cooled by spraying or injecting a cryogenic freezer. Conventional processes for processing wiber require about 1.1 to 1.5 pounds of nitrogen per pound of wiber. Since the method of the invention cools only the surface of wiber and utilizes a hammer mills with three separate grinding zones, only about 0.6 pounds of nitrogen per pound of wiber is presently consumed. This reduction of the quantity of nitrogen required to cool the wiber results in significant cost savings when the process of the invention is utilized.

Figure 9:
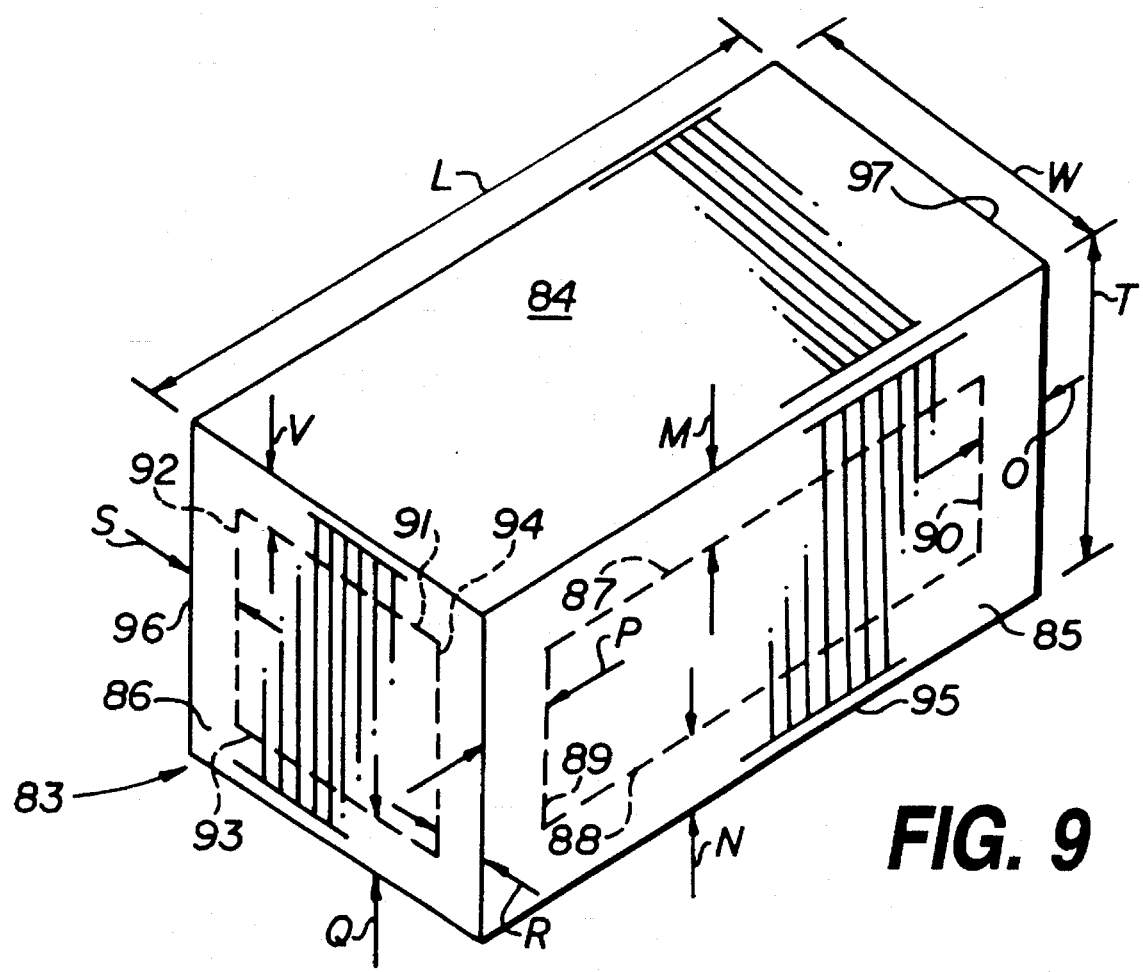

The preferred cooling of wiber is explained with reference to the ideal piece of wiber illustrated in FIG. 9. The piece of wiber 83 has a length indicated by arrows L, a width indicated by arrows W, and a thickness indicated by arrows T. The length L is in the range of one to four inches, is preferably one and a half to two and a half inches, and ideally is two inches. The width W is in the range of one inch to four incbest is preferably one and a half to two and a half inches, and ideally is two inches. The thickness is in the range of one-quarter to one inch, preferably one-quarter to three-quarters of an inch. Wiber 83 includes parallel, opposed, spaced apart, equal-sized top 84 and bottom 95 surfaces; includes parallel, opposed, spaced apart, equal-sized square end surfaces 86 and 97; and includes parallel, opposed, spaced apart, equal-sized rectangular front and back surfaces 85 and 96, respectively. As will be appreciated by those of skill in the art, the wiber 83 illustrated in FIG. 9 is an ideal shape. Wiber pieces produced in the practice of the invention ordinarily have a much more irregular shape.

As noted above, each surface on the wiber piece 83 is cooled to at least minus one hundred and twenty degrees F to a depth which is fifteen to forty percent of the thickness T of the wiber. Consequently, when the surfaces of wiber 83 are cooled to at least minus one hundred and twenty degrees F in accordance with the invention, the following cooling depths each equal fifteen to forty, preferably twenty-five to thirty, percent of the thickness T of the wiber: The depth from side surface 85 to dashed line 94 as indicated by arrows R; the depth from top surface 84 to dashed line 91 as indicated by arrows T; the depth Q from bottom surface 95 to dashed line 93; the depth N from bottom surface 95 to dashed line 88; the depth M from top 84 to dashed line 87; the depth S from back surface 96 to dashed line 92; the depth P from side surface 86 to dashed line 89; and, and the depth O from side surface 97 to dashed line 90. If the wiber piece 83 is one inch long by one inch wide by one inch thick and 25% of the width (one inch) of piece 83 equal the surface depth of the piece 83 which is cooled to one hundred and twenty degrees F, then the surface volume of piece 83 cooled to 120 degrees F equals one cubic inch minus 0.75 cubed and equals:

1.0000−0.4219= 0.5781 cubic inches.

Cooled wiber from freezer 19 is directed into the double hammer mill 20 to pulverize the wiber and separate the rubber from the cord or fiber in the wiber. Pulverized wiber from the hammer mill 20 is directed to shaker or gravity table 23 to produce by-product 24 and by-product 25. The pulverized wiber consists of about 80% rubber, 10% steel, and 10% fiber by weight. The by-product 25 directed from shaker 23 to shaker table 26 is about 2 to 4% steel, 2 to 4% fiber, and 92 to 96% rubber by weight. The shaker table 23 also produces waste steel and fiber 24. The by-product 27 from shaker table 26 is about 98% rubber and 2% fiber and steel by weight. When the surfaces of the wiber are cryogenically frozen to minus one hundred and twenty degrees F prior to being introduced in mill 20, approximately ten percent by weight of the rubber in by-product 27 is −40 to −80 mesh in size. When the surfaces of the wiber are cryogenically frozen to minus one hundred and thirty degrees F prior to being introduced in mill 20, approximately twenty-five percent by weight of the rubber in by-product 27 is −40 to −80 mesh in size. When the surfaces of the wiber are cryogenically frozen to minus one hundred and forty to minus one hundred and fifty degrees F (or lower) prior to being introduced in mill 20, then approximately forty percent by weight of the rubber in by-product 27 is −40 to −80 mesh in size.

By-product 27 is sifted to separate out the −10 mesh, −20 mesh, −30 mesh, and −40 or smaller fractions of rubber particles. The sizes of particles separated out by sifters 33 can be selected as desired. Each fraction of rubber is bagged or otherwise packaged 34.

A suction air stream in hammer mill 20 draws off cord fiber and rubber which is directed 21 into cyclone 29. About ten to fifteen percent by weight of the total amount of rubber recovered by the process of the invention is in the air stream directed to cyclone 29 from mill 20. The rubber 30 separated by cyclone 29 from the fiber in stream 21 is directed to shaker table 23. Waste fiber 35 produced by cyclone 29 is discarded. Dust 31 from cyclone 29 is collected in bag housh 32.

Figure 2:
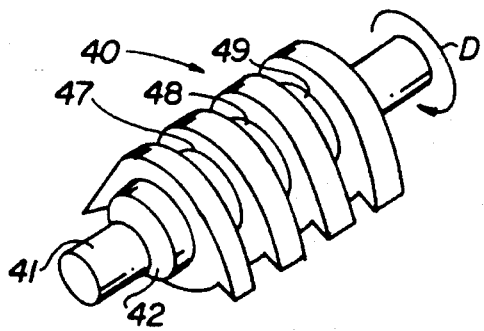
FIG. 2 is a perspective view illustrating the cylindrical rotating disk component of shredding assemblies utilized in the invention.

Shredders 11 and 13 each utilize a series of spaced apart rotating generally cylindrical disks 43 to 46 which interfit with fixed toothed cutting edges in panels 50 and 51. Blades 52, 53 (FIG. 4) are mounted in each disk. Cylindrical spacers 42, 47 to 49 are used to space apart disks 43 to 46. The cylindrical disks of shredders 11 and 13 are illustrated in FIGS. 2 to 4 and include disks 43 to 46 and spacers 42, 47 to 49. Each disk 43 to 46 and spacer 42, 47 to 49 is fixedly secured to and rotates simultaneously with cylindrical shaft or axle 41. As is illustrated in FIG. 3, disks 43 to 46 interfit with toothed cutting edges formed in plates or panels 50 and 51. When disks 43 to 46 rotate in the direction indicated by arrow D in FIGS. 2 and 4, tires are forced intermediate the disks and panel 50 in the manner indicated by arrows A and B. When tires are forced intermediate disks 42 to 49 and panel 50, the tires are sheared, torn, and shredded.

Figure 6:
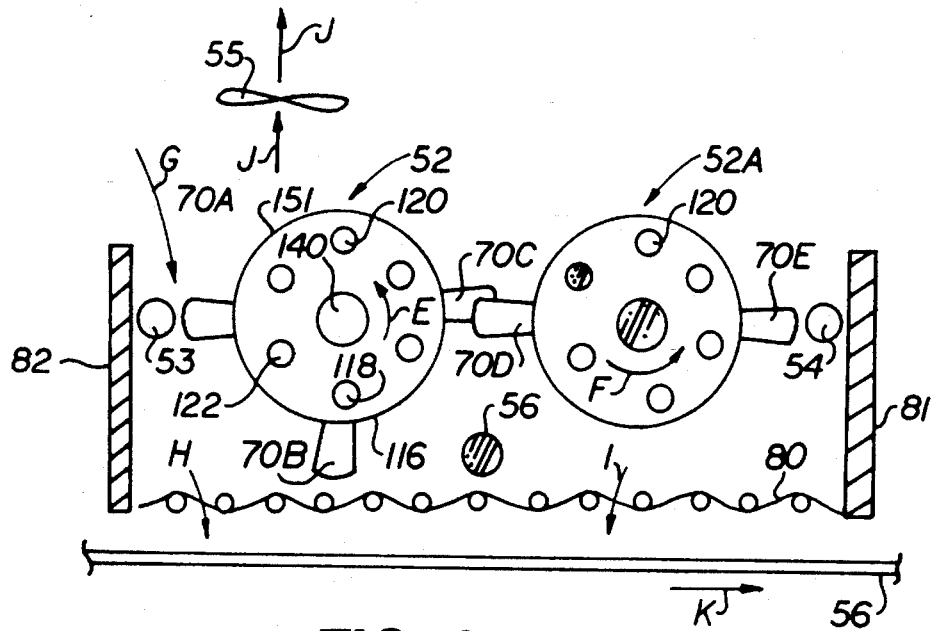
FIG. 6 is a side elevation view illustrating the mode of operation of the double hammer mill of the invention.

The double hammer mill 20 is illustrated in further detail in FIGS. 5 and 6. The hammer mill 20 utilizes a pair of identical, spaced apart, parallel, opposed hammer assemblies 52 and 52A. The hammer assembly 52 is illustrated in FIG. 5 and includes plates 116 are mounted on shaft 140 such that the apertures 118A to 123A in one plate are aligned with the corresponding apertures 118A to 123A in each of the other plates so that an elongate cylindrical rod 120 can be slidably inserted and removably fixed in apertures 120A; so that an elongate cylindrical rod 121 can be inserted and removably fixed in apertures 121A; so that an elongate cylindrical rod 122 can be inserted and removably fixed in apertures 122A; so that an elongate cylindrical rod 123 can be inserted and removably fixed in apertures 123A; so that an elongate cylindrical rod 118 can be inserted and removably fixed in apertures 118A; and, so that an elongate cylindrical rod 119 can be inserted and removably fixed ill apertures 119A. Set screws or any other desired prior art means can be used to secure rods 118 to 123 in apertures 118A to 123A, respectively.

When a rod 120 is being slidably inserted through apertures 20A, a hammer 70 can be positioned intermediate each adjacent pair of plates 116 such that aperture 133 of hammer 70 is aligned with apertures 120A. This permits rod 120 to slide through aperture 133 to secure hammer 70 on rod 120 in the manner indicated by dashed lines 70 in FIG. 5. In FIG. 5, a hammer 70 can be, and customarily is, similarly mounted on rod 120 (and rods 118, 119, 121 to 123) intermediate each adjacent pair of plates 116. Hammers 70 are fixedly removably secured to a rod 118 to 123 by a set screw or other means. As noted below, it is important that the hammers 70 be fixedly secured and not be permitted to freely pivot about a rod 119 to 123. Each rod 118 to 123 is of equivalent shape and dimension. Each pair of plates 116 in FIG. 5 is equidistant, as indicated by arrows C, from adjacent plates 116. Spacers (not visible) are mounted on shaft 140 between each adjacent pair of plates 116 to position each pair of plates 116 a selected distance C apart.

Disks 116 each are twenty to forty, preferably twenty eight to twenty-two, inches in diameter. The disks rotate at 1000 to 2000 rpm (revolutions per minutes), preferably 1000 to 1800 rpm. At the point of closest approach of a hammer 70 to a striker bar 53 or 54 or 56, the end of the hammer is within 0.002 to 0.010 inches, preferably 0.003 to 0.004 inches, of the striker bar. Similarly, at the point of closest approach of a hammer 70C and hammer 70D, the distance between the hammers is 0.002 to 0.010 inches, preferably 0.003 to 0.004 inches.

In FIG. 6, identical, parallel, hammer assemblies 52 and 52A counter rotate in the directions indicated by arrows E and F. Shafts 140 of each assembly 52, 52A are mounted for rotation about a fixed axis generally perpendicular to the plane of the sheet of paper of the drawings. Cylindrical striker bars 53, 54, and 56 are fixedly mounted in the hammer mill 20 such that the longitudinal axes and centerlines of bars 53, 54 and 56 are parallel to one another and to the shafts 140. Flat screen 80 lies in a plane generally perpendicular to the plane of the sheet of paper of the drawings and to end plates 81 and 82. Plates 81 and 82 are oriented such that they are generally perpendicular to the plane of the sheet of paper of the drawings.

Figure 8:
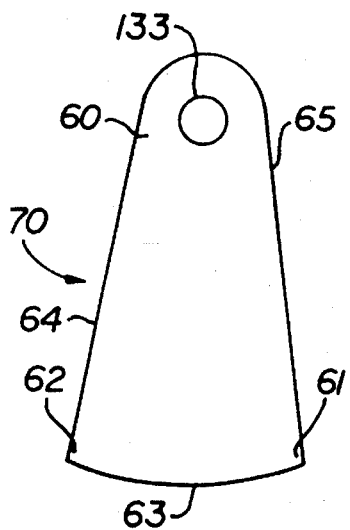
FIG. 8 is a top view of a hammer utilized in the hammer mill of FIGS. 6 and 7; and, FIG. 9 is a perspective view of an ideally shaped piece of wiber illustrating the cooling of the surfaces of the wiber achieved during cryogenic cooling.
Figure 7:
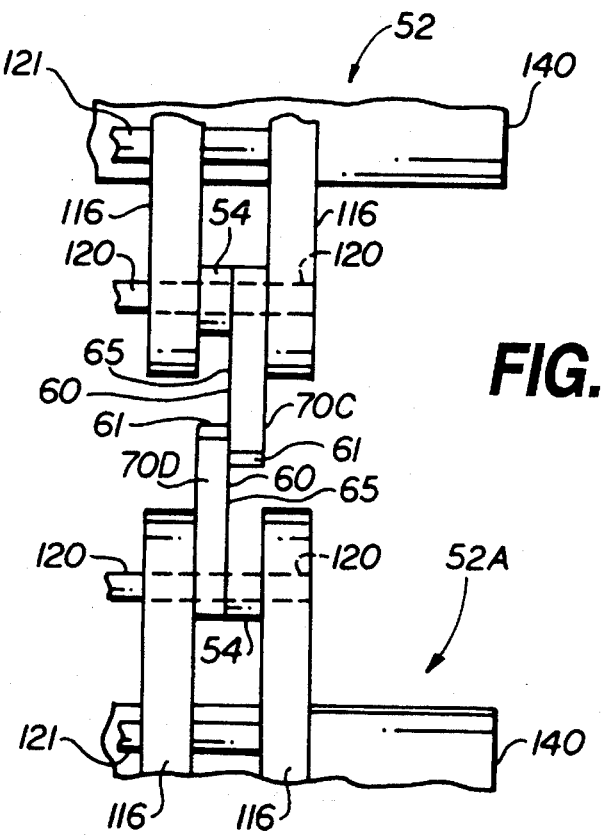
FIG. 7 is a top view of a portion of the hammer mill of FIG. 6 illustrating the mode of operation of a pair of hammers each from a different one of the hammer assemblies.

FIG. 7 is a top view of a portion of the hammer mill of FIG. 6 illustrating the travel of a pair of hammers 70C and 70D past one another in the grinding zone between the hammer assemblies 52 and 52A. Since hammers 70C and 70D pass close to one another (preferably to within 0.003 to 0.0004 inch as noted above) when they are in the position illustrated in FIGS. 6 and 7, the hammer assemblies 52 and 52A must be constructed and assembled to close tolerance. FIG. 7 illustrates, without limitation, one embodiment of the invention constructed to permit a pair of hammers 70C and 70D on assemblies 52 and 52A to pass close to one another. In FIG. 7, each hammer 70C, 70D is mounted with a spacer 54 on a rod between a pair of adjacent disks 116 such that each hammer 70C and 70D passes to one side of but closely adjacent to the other hammer during rotation of assemblies 52 and 52 in the directions indicated by arrows E and F, respectively, in FIG. 6. Wiber pieces which are between hammers 70C and 70D as the hammers approach and pass each other are sheared by the approaching linear edges 65 of the hammers and are also accelerated into one another to facilitate the breakup and granulation of the wiber pieces. The hammer 70 illustrated in FIG. 8 includes face 60, aperture 133 formed therethrough, linear edges 64 and 65, corners 61 and 62, and outer arcuate end 63. Hammers 70A to 70E are each identical to hammer 70.

In operation of the hammer mill of FIG. 6, embrittled wiber is direct into mill 20 in the direction indicated by arrow G. Hammers, such as the hammer 70A, force the wiber intermediate the hammer and striker bar G, fracture the embrittled surface portions of the wiber, and shear and tear the portions of the wiber which are not embrittled. The surfaces of wiber entering the mill in the direction of arrow G are frozen to a temperature of at least minus one hundred and twenty degrees F. The area between bar 53 and hammers passing adjacent bar 53 is termed the first grinding zone of mill 20.

After passing through the first grinding zone, pulverized wiber is carried in the direction of arrow E and passes into the second grinding zone comprising the area between striker bar 56 and hammers 70 at the point of closest approach of the hammers to bar 56. Hammers 70 force the wiber intermediate the hammer and striker bar G, fracture embrittled surface portions of the wiber, and shear and tear the portions of the wiber which are not embrittled. In order to slow the thawing of wiber as it travels through mill 20, nitrogen gas from freezer 19 is directed into mill 20 with cooled wiber in the direction of arrow G in FIG. 6. The nitrogen has a temperature of approximately zero degrees F and is produced when liquified nitrogen is contacted with wiber in freezer 19. This use of cooled nitrogen gas is important because it prolongs the time during which portions of the wiber are embrittled and can be fractured in mill 20. The use of cooled nitrogen gas also minimize heat damage to rubber in the wiber.

After passing through the second grinding zone, pulverized wiber is carried in the direction of arrow E and passes into the third grinding zone intermediate hammer assemblies 52 and 52A. In the second grinding zone, hammers (like hammer 70C in FIG. 6) from assembly 52 closely interfit with hammers (like hammer 70D in FIG. 6) from assembly 52 to further pulverize and shear wiber. About 50% of the surface areas of the wiber which were originally embrittled in freezer 19 and which pass through the third grinding zone are still embrittled. The remaining 50% of the surface areas of the wiber which were originally embrittled in freezer 19 are slightly cooler than ambient temperature and are no longer embrittled. Fan 55 creates a stream of air in the direction indicated by arrows J and tends to draw separated cord fiber and some rubber particles from above hammer assembly 52. This cord fiber and rubber particulate is directed 21 to cyclone 29 as indicated in FIG. 1. Mill 20 separates about 95% to 98% of the fiber from the wiber. Air stream J carries away about 60% to 70% of this fiber. Some of the pulverized wiber from the third grinding zone is carried in the direction of arrow F to the fourth grinding zone.

The fourth grinding zone comprises the space between striker bar 54 and hammers, like hammer 70E, which travel adjacent bar 54. Hammers passing adjacent bar 54 further shear and pulverize wiber. In the fourth grinding zone, the wiber is, after have passed once through the first, second and third grinding zones, generally at about room temperature of about seventy to eighty degrees F.

Cord fiber which is not drawn out of mill 20 by fans 55 falls onto and may pass through screen 80. Hammer mill 20 also produces fine rubber crumb have a mesh of less than minus ten. This crumb passes through screen 80 onto conveyor 56. Conveyor 56 carries the crumb to a packaging station.

Having described the invention in such terms as to enable those skilled in the art to understand and practice it, and having described the presently preferred embodiments thereof, I claim:

1. A process for separating rubber and steel from tires, said tires each including a tread, sidewall, and bead, said process comprising the steps of
   (a) shredding a flow of tires into pieces;
   (b) screening the flow of tire pieces by size into a first flow containing pieces at least as large as a first specified size, into a second flow of pieces each smaller than said specified size and each at least as larqe as a second specified size, and into a third flow of pieces each smaller than said second specified size, said first, second and third flows each containing pieces from the bead, side wall, and tread of the tires;
   (c) reshredding and rescreening the pieces of the first flow until they are smaller than said first specified size;
   (d) producing a fourth flow of tire pieces each smaller than said second specified size by reshredding the pieces of the second flow;
   (e) directing said third and fourth flows of tire pieces into a magnetic separator to separate steel and steel-containing rubber pieces from said third and fourth flows of tire pieces;
   (f) embrittling the steel-containing rubber pieces from step (e) by cryogenically cooling the steel-containing containing rubber pieces from step (e) to a temperature of at least minus one hundred and twenty degrees F, the steel-containing rubber pieces each being cooled and embrittled only to a surface depth in the range of 20% to 35% of the thickness of the piece; and
   (g) shearing the cryogenically cooled steel-containing rubber pieces from step (f).

2. A process for separating rubber and fiber from tires, comprising the steps of
   (a) shredding a flow of tires into pieces each having a width in the range of one to four inches, having a lenqth in the range of one to four inches, and having a thickness in the range of one-quarter of an inch to one inch;
   (b) separating steel and steel-containing rubber pieces from the tire pieces with a magnetic separator to produce a primary flow of substantially steel-free rubber pieces and a secondary flow of rubber pieces each containing a greater proportion of steel than the rubber pieces in said primary flow of rubber pieces;
   (c) cryogenically embrittling and cooling said secondary flow of rubber pieces to a temperature of at least minus one hundred and twenty degrees F, said pieces in said secondary flow each being cooled and embrittled only to a surface depth in the range of 20% to 35% of the thickness of the piece;
   (d) shearing the cryogenically cooled embrittled rubber pieces in a double hammer mill including
      (i) first and second rotating hammer assemblies in spaced apart relationship such that hammers on the first rotating hammer assembly rotate in a direction opposed to the direction of rotation of hammer in the second hammer assembly, and move past and interfit between the paths of travel of hammers on the second hammer assembly at the point of closest approach to the second hammer assembly of the hammers on the first hammer assembly, (ii) first and second striker surfaces, (iii) a first shearing zone wherein the cooled rubber pieces are forced against the first striker surface by the hammers on the first rotating hammer assembly, (iv) a second shearing zone between the first and second rotating hammer assemblies where partially thawed rubber pieces are sheared between interleaved hammers from the first and second rotating hammer assemblies, and (v) a third shearing zone wherein completely thawed rubber pieces are forced against the second striker surface by the hammers on the second rotating hammer assembly.

* * * * *